June 11, 1963 F. RUSCONI 3,093,194
AEROMOTOR
Filed May 4, 1960 2 Sheets-Sheet 1

INVENTOR.
Fausto Rusconi
BY
Michael S. Striker

June 11, 1963  F. RUSCONI  3,093,194
AEROMOTOR
Filed May 4, 1960  2 Sheets-Sheet 2

INVENTOR.
Fausto Rusconi
BY
Michael S. Striker
Attorney

United States Patent Office  3,093,194
Patented June 11, 1963

3,093,194
AEROMOTOR
Fausto Rusconi, 20 Via I° Maggio, Como, Italy
Filed May 4, 1960, Ser. No. 26,773
Claims priority, application Italy May 5, 1959
14 Claims. (Cl. 170—33)

This invention generally relates to aeromotors, that is to a wind powered mechanism including an airfoil supporting rotating assembly capable of transforming the power of blowing wind into rotary motion, and designed to be operated where other sources of power are not available or are available only with difficulty.

More particularly, this invention is concerned with a wind powered mechanism of the type including an assembly supported for rotation about a vertical axis at the top of a tower or other suitable structure and including a plurality of vertically elongated airfoil forming concave blades, evenly positioned about said vertical axis, the said assembly being rotated about said axis as the wind successively impels on the concave face of each blade, as known to those skilled in the art to which this invention appertains.

It is the primary object of this invention to provide a new and advantageous wind propelled device of the type referred to above, including concave blades hingedly connected in a rotatable frame structure and drivingly connected to a power take-off shaft by means of spring loaded resilient link means adapted for varying the angle at which the wind may impel on said concave faces as a function of the varying wind power, and in relation with the resistance applied to said power take-off shaft by the driven mechanisms, for example, a pump, a generator, a mill or other device, whereby the aeromotor may be made self-adjusting to the wind speed.

Another object of this invention is to provide a new and improved self-adjusting wind powered mechanism including resilient means to support the rotatable frame structure on its parent supporting tower or structure for spring absorbing the shocks or other sharply variable stresses due to the pulsing action of the wind on the airfoils which successively travel along the arc at which the concave surfaces thereof face the direction of the wind.

Another object of this invention is to provide a wind propelled mechanism of the above type, which is simple of construction and safe and reliable in operation.

These and other objects and advantages of the invention are in part obvious and in part will be made apparent as this description proceeds, and the features which are believed to be new and characteristic of the invention are in particular set forth in the appended claims. The invention itself, however, both as to its construction and to its mode of operation, will be best understood from the following detailed description of a preferred form of embodiment thereof, when read in conjunction with the accompanying drawings, wherein:

Figure 1:
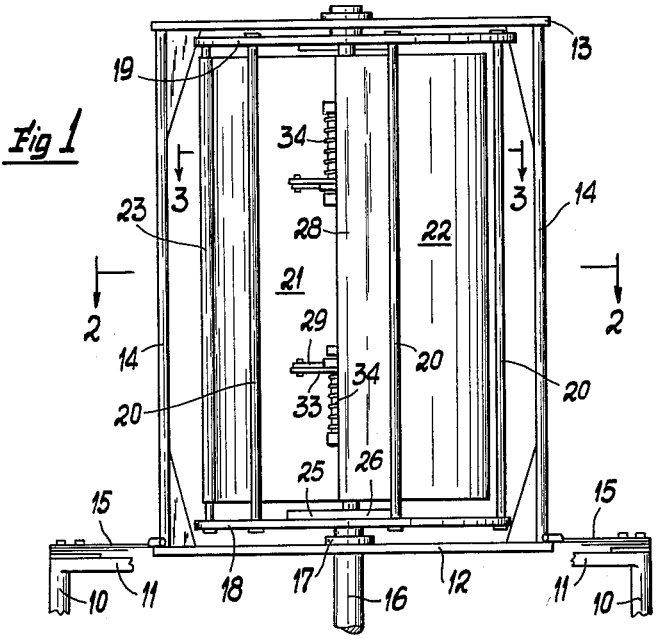
FIGURE 1 is a front view of an embodiment of the rotating assembly of the wind propelled mechanism of the invention and of its parent supporting structure.
Figure 3:
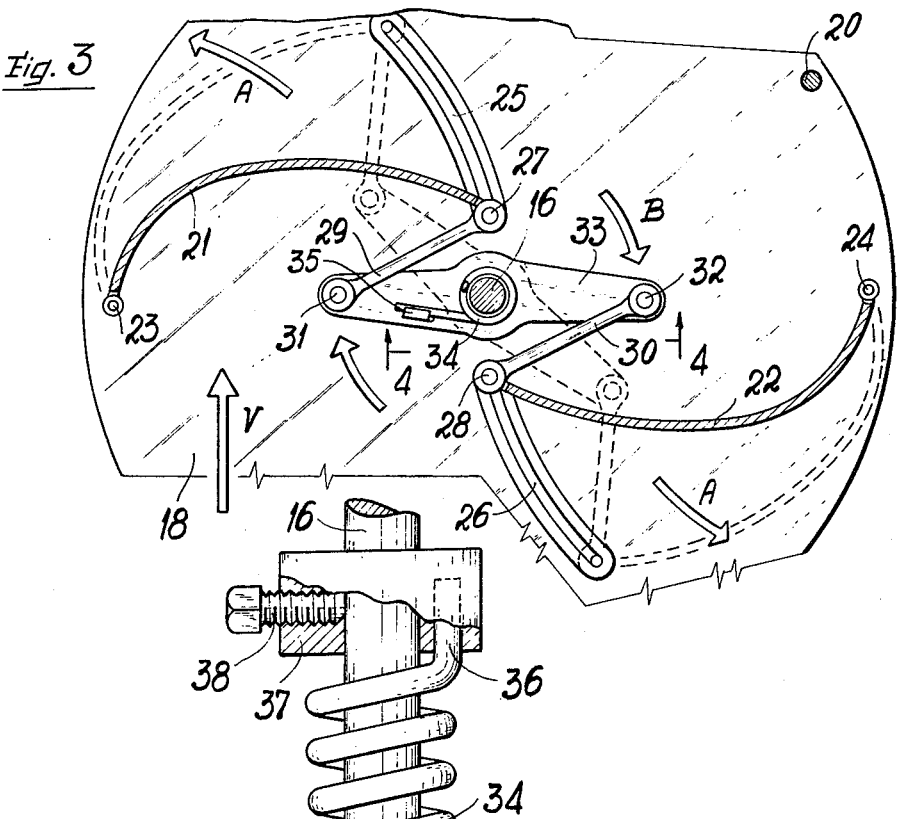
Figure 4:
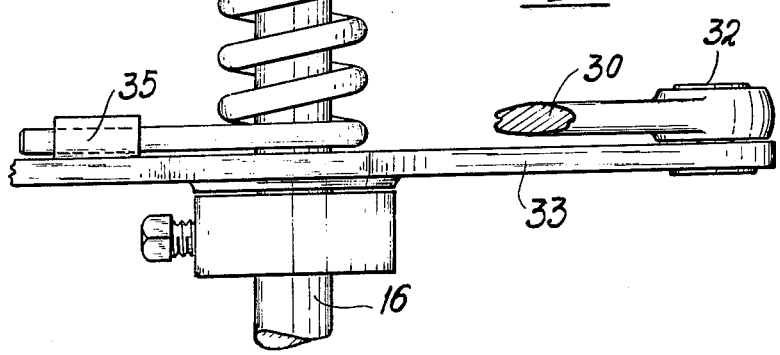

FIGURE 3 illustrates, in enlarged scale, a detail of the airfoils and of the link means connected thereto, for full understanding of the operation of the device of the invention, such detail being shown in sectional view taken in plane 3—3 of FIG. 1; and FIGURE 4 illustrates a detail of one of the spring means included in the device and shown in side and sectional view taken in plane 4—4 of FIG. 3.

Referring now to the drawings:

The wind propelled device of the present invention is adapted to be generally arranged on the top of a suitably constructed tower; the upper end portions of the struts or posts thereof are indicated at 10 in FIG. 1. Such end portions may be connected to horizontal braces 11 forming a supporting frame for the aeromotor. The device itself is supported in and by a cage-like structure including a lower platform 12 and an upper platform 13, connected by a plurality of struts 14.

The cage-like structure 12—14 is spring supported for oscillation on the top of the supporting tower, for example, by means of a plurality of cantilever springs 15 secured to the corners of the frame embodied by the said braces 11, whereby the wind impelled components supporting structure may substantially oscillate and resiliently absorb the pulsing action exerted on the airfoils, thus avoiding the stresses which may be caused by the sharpness of such pulsing action.

The cage-like structure 12—14 is vertically traversed at the axis thereof by the aeromotor power take-off shaft 16, rotatably supported at the centers of said platforms 12 and 13 by suitable bearings, one of which is indicated at 17. The wind driven rotatable assembly is arranged in the cage-like structure between the platforms 12 and 13.

Figure 2:
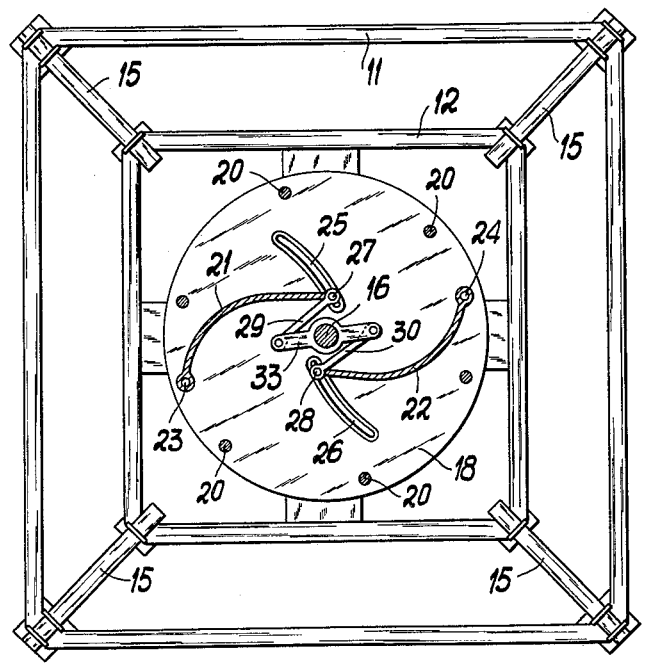
FIGURE 2 is a horizontal sectional view of the embodiment of FIG. 1, taken in the plane and direction indicated at the lines 2—2 in FIG. 1.

The rotatable assembly includes a lower disk-like plate 18 and an upper similar plate 19, connected by evenly arranged vertical struts 20. The plates are freely rotatable about the take-off shaft 16. In the preferred embodiment shown, the wind propelled device of the invention includes two airfoil forming blades, generally indicated at 21 and 22, respectively, symmetrically arranged about the shaft 16. As shown in FIGS. 2 and 3, each of said blades is curved so that its vertical surfaces embody a concave face and an opposite convex face. According to current knowledge in the art, a rotatable assembly, including a plurality of airfoils shaped and arranged as shown, will be caused to be rotated by an air flow impelling on their concave faces, since said airfoils successively travel along an arc at which the wind direction impels on the concavities.

Suppose, for example, that the wind blows in the direction indicated by arrow V in FIG. 3. The convex face of the airfoil 22 would offer a lesser resistance to the wind than the concave face of the oppositely located airfoil 21, and therefore the rotatable assembly would be caused to rotate about its vertical axis in the direction indicated by curved arrow B, according to the current practice in the art of wind powered devices of the type considered.

The rotary power therefore obtained will obviously have a pulsing character, due to the successive passage of the airfoils in the position at which such condition occurs. The above described provision of spring means 15 to support the rotating assembly on its supporting tower provides a shock absorbing means adapted to minimize the prejudicing dynamic effects of such pulsing action.

According to the invention, each blade 21 and 22 is hingedly connected at its trailing edge to the rotatable assembly, for example, to struts 23 and 24, respectively, for oscillation about vertical axes embodied by said struts. The amplitude of said oscillation is defined by arc-shaped guide means 25 and 26, respectively supported by the plates 18 and 19, wherein guide pivots or rollers supported at the upper and lower ends of the inner edge of the airfoils are guidedly engaged.

Upon the provision of the hinge connection of the curved blades 21 and 22 to the rotatable structure, under the pressure of wind, applied to the concave faces of the airfoils, such blades will develop a tendency to rotate in the directions indicated by arrows A in FIG. 3, about their hinge axes embodied by the struts 23 and 24, respectively. This tendency is made use of, according to the invention, to attain the principal object of the invention, that is the self-adjustment of the wind propelled airfoil system to the speed and force of wind.

To attain this object, the thrust of wind on the airfoils is transmitted to the motor power take-off shaft 16 by link means including spring loaded means, which are described in detail below with reference to FIGS. 3 and 4. A plurality of such spring loaded link means may be provided at proper vertical spacing relationship in the height of the airfoils, for proper distribution of stresses. In the form of embodiment shown in FIG. 1, two link means are provided, but it is obvious that a greater number of such means may be provided, according to the vertical dimension of the mechanism.

Each link means includes a hinge connection at 27 and 28, respectively, between the free or inner edge of the airfoils and linking rods 29 and 30, respectively. The other end portion of each rod 29 and 30 is hingedly connected at 31 and 32, respectively, to the oppositely located end portions of a two-armed horizontal lever member 33 rotatable about the power take-off shaft 16. A spring means, preferably a torque transmitting coil spring 34, is arranged about the shaft 16 and its end portions 35 and 36 are connected to the two-armed lever 33 and to a hub 37 adjustably secured to said shaft 16, by means, for example, of a screw 38.

As will be readily understood upon consideration of FIGS. 3 and 4, the resistance applied to the power take-off shaft 16 by the driven mechanisms drivingly connected thereto (for example, a pump or a generator, not shown) operates as a brake upon rotation of said shaft. The pressure of the wind applied to the concave face of the airfoil in its operative phase (for example the blade 21 of FIG. 3) will tend to oscillate said airfoil in direction A about its trailing edge and to rotate the entire assembly in direction B. The tendency to oscillate, applied to the link rods 29, causes the two-armed lever 33 to rotate in direction B about the shaft, spring loading the coil spring or springs 34 until a balance of driving torque and resisting torque is attained.

The resisting torque obviously increases as the rotational speed of the driven mechanisms is increased, and therefore the relative rotational position of the two-armed lever 33 relative to the shaft 16 will vary as a function of said rotational speed. The rotational speed at which the airfoil assembly is rotated by the wind will increase as a function of the linear speed of the flow of air, that is, the force of wind, and therefore the angle at which the airfoil 21 faces the direction V of the wind will progressively decrease as the force of the wind increases. At the same time, as the airfoils progressively rotate in direction A in respect to the frame structure of the rotating assembly, a progressively wider space is formed between the inner edges of the airfoils 21 and 22, and a progressively lesser resistance is offered by the whole wind impelled structure to the air which flows thereacross.

The airfoils 21 and 22 are shown in full lines, in FIG. 3, in their best position for operating under a light breeze, and in broken lines in their "open" position, in which the device may readily resist and operate under gusts of wind. The progressive increasing of the oscillational movement in direction A may begin at a previously determined speed of the wind, by properly loading the spring means.

In addition, the variation of the angle of airfoil system under the pressure of the wind will cause the device of the invention to operate under conditions similar to those of a "variable pitch" screw propeller. That is, the increment of the rotational speed of the assembly will be greatly smaller than the increment of the linear speed of blowing air, therefore preventing the rotating parts and the driven mechanisms from attaining too high a speed even under gale conditions.

It is believed to be evident that the present invention includes a plurality of advantageous features, and it will be understood that each of the new features described and any combination thereof may also find useful application in other constructions of wind propelled devices differing from the one described.

Without further analysis, the foregoing will so fully reveal the gist of this invention that others can, by applying current knowledge, readily adapt it for various applications without omitting features that, from the standpoint of prior art, fairly constitute essential characteristics of this invention and, therefore, such adaptations should and are intended to be comprehended within the spirit and meaning of equivalents of the invention, as defined in and by the appended claims.

Having thus described the invention and the mode of carrying it out, what is claimed as new and desired to be protected by Letters Patent is:

1. A wind powered rotary mechanism designed for installation at the top of a tower-like supporting structure, including, in combination, a cage-like frame; spring means secured to said supporting structure and said frame resiliently supporting said frame on said supporting structure; a substantially vertical power take-off shaft rotatably supported in said frame; a rotatable assembly rotatably supported about said shaft inside said frame, said rotatable assembly consisting of spaced members connected by struts, a pair of substantially vertical elongated curved blades symmetrically located between said spaced members and each having an outer trailing edge and an inner edge, said blades forming an airfoil; hinge means to support each curved blade for oscillation about its trailing edge; and spring loaded link means connecting the inner edges of said blades to said power take-off shaft to progressively decrease the angle between said trailing edge and the direction of wind, upon oscillation of said blades, as a function of increasing wind force.

2. A wind powered rotary mechanism designed for installation at the top of a tower-like supporting structure, including, in combination, a cage-like frame, spring means secured to said supporting structure and said frame for resiliently supporting said frame on said supporting structure; a substantially vertical power take-off shaft rotatably supported in the frame; and rotatable assembly rotatably supported about said shaft inside said frame, said rotatable assembly consisting of spaced disk members connected by struts; a pair of substantially vertical elongated curved blades symmetrically located between said spaced disk members and each having an outer trailing edge and an inner edge, said blades forming an airfoil; hinge means to support each curved blade for oscillation about its trailing edge; guide means in said disk members to guide the oscillational movements of said blades about the respective trailing edge thereof; and spring loaded link means connecting the inner edges of said blades to said power take-off shaft to progressively decrease the angle between said trailing edge and the direction of wind, upon oscillation of said blades, as a function of increasing wind force, each link means including a linking rod connecting said inner edge to an end portion of a lever rotatable about said shaft and a spring loaded torque resisting spring to resiliently connect said lever to said shaft.

3. A wind powered rotary mechanism designed for installation at the top of a tower-like supporting structure, including, in combination, a cage-like frame having vertically spaced upper and lower horizontal platforms connected by vertical struts; spring means secured to said supporting structure and said frame resiliently supporting said frame on said supporting structure; a vertical power take-off shaft rotatably supported by said platforms at the centers thereof; a rotatable assembly rotatably supported about said shaft between said upper and lower platforms, said rotatable assembly consisting of vertically spaced horizontal members connected by other vertical struts; a pair of vertically elongated curved blades symmetrically located between said spaced horizontal disk members and each having an outer trailing edge and an inner edge, said blades forming an airfoil; hinge means to support each curved blade for oscillation about its trailing edge; and a plurality of spring loaded link means connecting at vertically spaced levels the inner edges of said blades to said power take-off shaft to progressively decrease the angle between said trailing edge and the direction of wind, upon oscillation of said blades, as a function of increasing wind force.

4. A wind powered rotary mechanism designed for installation at the top of a tower-like supporting structure, including, in combination, a frame; spring means secured to said supporting structure and said frame resiliently supporting said frame on said supporting structure; a vertical power take-off shaft rotatably supported in said frame, a rotatable assembly rotatably supported about said shaft inside said structure, said rotatable assembly consisting of vertically spaced horizontal members connected by vertical struts; two vertically elongated curved blades symmetrically located between said spaced horizontal members and each having an outer trailing edge and an inner edge, said blades forming an airfoil; hinge means to support each curved blade for oscillation about its trailing edge; guide means in said horizontal members to guide the oscillational movements of said blades about the respective trailing edge thereof at the upper and lower ends of their inner edge; and a plurality of spring loaded link means connecting at vertically spaced levels the inner edges of said blades to said power take-off shaft to progressively decrease the angle between said trailing edge and the direction of wind, upon oscillation of said blades, as a function of increasing wind force, each link means including a linking rod connecting said inner edge to an end portion of a two-armed lever rotatable about said shaft and a spring loaded torque resisting coil spring to resiliently connect said lever to said shaft.

5. A wind powered rotary mechanism designed for installation in a frame at the top of a tower-like supporting structure, including, in combination, a cage-like frame having vertically spaced upper and lower horizontal platforms connected by vertical struts; cantilever spring means secured to said supporting structure and said frame resiliently supporting said frame on said supporting structure; a vertical power take-off shaft rotatably supported in said platforms at the centers thereof; a rotatable assembly rotatably supported about said shaft between said upper and lower platforms, said rotatable assembly consisting of vertically spaced horizontal disk members connected by other vertical struts; two vertically elongated curved blades symmetrically located between said spaced horizontal disk members and each having an outer trailing edge and an inner edge, said blades forming an airfoil; hinge means to support each curved blade for oscillation about its trailing edge; guide means in said disk members to guide the oscillational movements of said blades about the respective trailing edge thereof at the upper and lower ends of their inner edges; and a plurality of spring loaded link means connecting at vertically spaced levels the inner edges of said blades to said power take-off shaft to progressively decrease the angle between said trailing edge and the direction of wind, upon oscillation of said blades, as a function of increasing of wind force, each link means including a linking rod connecting said inner edge to an end portion of a two-armed lever rotatable about said shaft and a spring loaded torque resisting coil spring to resiliently connect said lever to said shaft.

6. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft, said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; and yieldable transmission means operatively connected to said vane means and shaft for yieldably resisting movement of said vane means so that said transmission means acts as a governor and for transmitting rotary movement of said vane means with said support means about said axis to said shaft for driving the latter, whereby said yieldable transmission means also absorbs shocks and provides a smooth power transmission between said rotary support means and vane means, on the one hand, and said driven shaft, on the other hand.

7. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft; said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; and resilient transmission means operatively connected to said vane means and shaft for resiliently resisting movement of said vane means from said rest position so that said transmission means acts as a governor and for transmitting rotary movement of said vane means with said support means about said axis to said shaft for driving the latter, whereby said resilient transmission means also absorbs shocks and provides a smooth power transmission between said rotary support means and vane means, on the one hand, and said driven shaft, on the other hand.

8. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft; said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; and spring means operatively connected to said vane means and shaft for biasing said vane means against movement from said rest position so that said spring means acts as a governor and as a transmitter of rotary movement of said vane means with said support means about said axis to said shaft for driving the latter, whereby said spring means also absorbs shocks and provides a smooth power transmission between said rotary support means and vane means, on the one hand, and said driven shaft, on the other hand.

9. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft; said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; link means pivotally connected to said vane means and said shaft; and yieldable transmission means connected to said link means and shaft for yieldably resisting movement of said link means from said rest position so that said transmission means acts as a governor and for transmitting rotary movement of said vane means with said support means about said axis to said shaft for driving the latter, whereby said yieldable transmission means also absorbs shocks and provides a smooth power transmission between said rotary support means and vane means, on the one hand, and said driven shaft, on the other hand.

10. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft; said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; link means pivotally connected to said vane means and including lever means coaxial with and freely turnable with respect to said shaft; and yieldable transmission means connected to said link means and shaft for yieldably resisting movement of said vane means from said rest position so that said transmission means acts as a governor and for transmitting rotary movement of said vane means with said support means about said axis to said shaft for driving the latter, whereby said yieldable transmission means also absorbs shocks and provides a smooth power transmission between said rotary support means and vane means, on the one hand, and said driven shaft, on the other hand.

11. In an apparatus for deriving energy from a moving fluid, in combination, a substantially rigid base; frame means; spring means connected to said frame means and to said rigid base supporting said frame means; a rotary driven shaft journaled on said frame means in substantially vertical position and adapted to be connected to a device which is to be driven; rotary support means coaxial with and freely turnable with respect to said shaft; said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases; and yieldable transmission means operatively connected to said vane means and shaft for yieldably resisting movement of said vane means from said rest position so that said transmission means acts as a governor and for transmitting rotary movement of said vane means with said support means about said axis to said shaft for driving the latter, whereby said yieldable transmission means also absorbs shocks and provides a smooth power transmission between said rotary support means and vane means, on the one hand, and said driven shaft, on the other hand.

12. In an apparatus for deriving energy from a moving fluid, in combination, resiliently supported frame means; a rotary driven shaft supported in substantially vertical position by said frame means and adapted to be connected to a device which is to be driven; rotary support means coaxial with and freely turnable with respect to said shaft; said rotary support means being positioned in said frame means; vane means comprising a pair of substantially vertical vanes carried by said rotary support means for turning movement therewith about the common axis of said shaft and support means and pivotally connected to said support means for movement with respect thereto toward and away from a rest position where said vane means receives a relatively large proportion of the energy of a moving fluid, said vane means being urged by the fluid away from said rest position and receiving a lesser proportion of the force of the moving fluid as its distance from said rest position increases, said rotary support means and vane means having cooperating cam guide and cam follower means for guiding said vane means toward and away from said rest position; and yieldable transmission means operatively connected to said vane means and shaft for yieldably resisting movement of said vane means from said rest position so that said transmission means acts as a governor and for transmitting rotary movement of said vane means with said support means about said axis to said shaft for driving the latter, whereby said yieldable transmission means also absorbs shocks and provides a smooth power transmission between said rotary support means and vane means, on the one hand, and said driven shaft, on the other hand.

13. A wind powered machine comprising, in combination, resiliently supported frame means; a rotary driven shaft journaled on said frame means in substantially vertical position and adapted to be connected to a device which is to be driven; rotary support means coaxial with and freely turnable with respect to said shaft, said rotary support means being positioned in said frame means; vane means comprising two substantially vertical vanes carried by said rotary support means for turning movement therewith about the common axis of said shaft and support means and connected to said support means for movement with respect thereto toward and away from a rest position where said vane means receives a relatively large proportion of the energy of a wind, said vane means being urged by the wind away from said rest position and receiving a lesser proportion of the energy of the wind as its distance from said rest position increases; link means pivotally connected to said vane means and including lever means coaxial with and freely turnable with respect to said shaft; and spring means connected to said shaft and said link means for yieldably biasing said vane means against movement from said rest position so that said spring means acts as a governor and as means for transmitting the rotary movement of said vane means with said support means about said axis to said shaft for driving the latter, whereby said spring means also absorbs shocks and provides a smooth power transmission between said rotary support means and vane means, on the one hand, and said driven shaft, on the other hand.

14. A wind powered machine comprising, in combination, resiliently supported frame means; a rotary driven shaft journaled on said frame means in substantially vertical position and adapted to be connected to a device which is to be driven; a rotary assembly including end plates coaxial with and freely turnable with respect to said shaft, said rotary assembly being positioned in said frame means; and vane means comprising a pair of substantially vertical vanes carried by the end plates of said rotary assembly for turning movement therewith about the common axis of said shaft and end plates and pivotally connected to said end plates for turning movement with respect thereto toward and away from a rest position where said vane means receives a relatively large proportion of the energy of a wind, said vane means being urged by the wind away from said rest position and receiving a lesser proportion of the energy of the wind as its distance from said rest position increases; link means pivotally connected to said vane means and including lever means coaxial with and freely turnable with respect to said shaft; and spring means connected to said shaft and said link means for yieldably biasing said vane means against movement from said rest position so that said spring means acts as a governor and as means for transmitting the rotary movement of said rotary assembly about said axis to said shaft for driving the latter, whereby said spring means also absorbs shocks and provides a smooth power transmission between said rotary assembly and said driven shaft.

References Cited in the file of this patent

UNITED STATES PATENTS

| | | |
|---|---|---|
| 92,311 | Hill | July 6, 1869 |
| 238,880 | Ford | Mar. 15, 1881 |
| 275,032 | Fletcher | Apr. 3, 1883 |
| 590,970 | Ducker | Oct. 5, 1897 |
| 720,427 | Henderson | Feb. 10, 1903 |
| 1,765,091 | Morris | June 17, 1930 |
| 1,766,765 | Savonius | June 24, 1930 |
| 1,793,748 | Pressnall | Feb. 24, 1931 |
| 1,954,811 | Gunn | Apr. 17, 1934 |
| 1,970,114 | Wiegand | Aug. 14, 1934 |

FOREIGN PATENTS

| | | |
|---|---|---|
| 1,058,012 | France | Nov. 4, 1953 |